United States Patent [19]

DeWitt et al.

[11] Patent Number: 4,784,324
[45] Date of Patent: Nov. 15, 1988

[54] SPRAYING APPARATUS

[76] Inventors: Carl DeWitt, Box 126, Rte. 2, Cobden, Ill. 62920; Gerald A. Fink, R.R. 2, Box 228, Murphysboro, Ill. 62966

[21] Appl. No.: 141,639

[22] Filed: Jan. 7, 1988

[51] Int. Cl.$^4$ .............................................. B05B 1/20
[52] U.S. Cl. ................................... 239/165; 239/166; 239/170; 239/172; 239/391; 52/118
[58] Field of Search .............. 239/159, 160, 164–168, 239/170, 172, 390, 391; 52/111, 114–118; 172/98, 132, 126, 477

[56] References Cited

U.S. PATENT DOCUMENTS

| | | | |
|---|---|---|---|
| 2,965,307 | 12/1960 | High | 239/165 X |
| 2,995,307 | 8/1961 | McMahon | 239/166 X |
| 3,055,594 | 9/1962 | Nansel | 239/166 X |
| 4,213,565 | 7/1980 | Jackson | 239/170 |
| 4,252,274 | 2/1981 | Kubacak | 239/165 X |
| 4,315,602 | 2/1982 | Kubacak et al. | 239/165 X |
| 4,447,007 | 5/1984 | Farines | 239/165 |
| 4,643,358 | 2/1987 | Jackson | 239/166 |
| 4,727,691 | 3/1988 | Kubacak | 239/165 X |

Primary Examiner—Andres Kashnikow
Assistant Examiner—Mary Beth O. Jones
Attorney, Agent, or Firm—Kalish & Gilster

[57] ABSTRACT

Apparatus for spraying of liquids for herbicidal and insecticidal application and the like has a supporting frame for being carried by a vehicle. An upright support is carried by the frame including an upright post and includes a hydraulic cylinder for providing selective vertical telescoping movement of the post. A hydraulic cylinder provides rotation of the post, for rotating a boom carried by the post. A hydraulic cylinder also provides selective pivoting of the supporting boom section relative to the post for vertical movement. The boom has a supporting boom section, a mid-boom section and a reconfigurable boom end element which may be either an articulating tip boom section or a strip spray attachment of "wishbone" configuration. A hydraulic motor provides selective telescoping movement of the mid-boom section relative to the supporting boom sections. The supporting boom section, mid-boom section and boom end element all include spray nozzles.

13 Claims, 9 Drawing Sheets

FIG. 5B PLAN

FIG. 5A ELEVATION

SPRAYING APPARATUS

BACKGROUND OF THE INVENTION

This invention relates to herbicidal and insecticidal spray application and, more particularly, to a self-contained sprayer for performing multiple spraying operations.

Highway authorities throughout the world are faced with undesirable vegetation under and along fences and guardrails, and clumps of undesirable growth or vegetation in otherwise free or open areas. Insect damage to trees and shrubs is also a concern. Utility companies are faced with undesirable trees or shrubs growing under overhead lines. Farmers have undesirable weeds growing in their crops and brush growing up in their fences. Current methods of controlling these undesirable conditions are primarily hand mowing, hand cutting of brush, or spraying.

Heretofore, specialized non-steerable sprayers have been available for spraying along guardrails, as well as area sprayers with fixed length booms and limited vertical movement. Vegetation under overhead utility lines is sometimes sprayed by aerial means utilizing helicopters or airplanes.

Heretofore, extensible spraying apparatus of vehicle mounted type has been proposed, such as disclosed in High U.S. Pat. No. 2,95,307 which reveals a truck-mounted sprayer having a spray boom which can be folded for travel and extended for use but which is not intended for having its boom geometry controllable for ground contour following, nor reconfigurable for strip spraying. Agricultural spray apparatus is also known, such as Jackson U.S. Pat. No. 4,213,565 and the same has foldable booms, but such agricultural spray applicators typically are fixed only for applying liquids to fields and other large areas, and are not intended to spray weeds or other vegetation along highway rights-of-way or along or in fences and the like. Farines U.S. Pat. No. 4,447,007 proposes a tractor-mounted swivelling device for spreading liquids by spraying, including a boom having hydraulically positioned elements for allowing a single spray head to be positioned above, on, or below ground level with pivoting about three orthogonal areas, but not suited either for applying spray along the full length of the boom nor rconfiguring of the spray head for strip spraying along both sides of a strip.

Accordingly, it is an object of the invention to provide spraying apparatus which is unique in its ability to accomplish a variety of herbicide and insecticide spraying functions formerly carried out by such diverse types of prior art sprayers. Thus, an object of the invention is to provide a spraying apparatus having a steerable boom for applying herbicide bands along and under guardrail and fences, the boom being adjustable in length and height to permit its contour to closely approximate the area being sprayed. In such apparatus, it is also an object that the end section of the boom articulate to be rotatable vertically nearly 270 degrees for permitting vertical spraying of fences or trees. A further object is that individual spraying sections of the boom be selectively activatable for permitting spraying clumps of undesirable weeds or trees. It is an object also that the boom be configured so that when fully extended and elevated, it will permit spraying insects in large trees or spraying herbicides upon brush in fences or under overhead utility lines; and that the boom provide adjustable terrain contouring for efficient overhead application of herbicides and insecticides.

An object of the invention is to provide such a sprayer which, when carried inside the bed of a truck, can be rotated to extend over the truck cab a sufficient distance for an operator to view the end of the boom, the boom having a wishbone spray system capable of straddling a fence or guardrail and spraying underneath a rail and along both sides, thus providing strip spraying. It is an object also to provide for boom adjustments to permit the carrier to drive different possible distances from the fence by swinging the boom horizontally while permitting vertical adjustment of the boom tip section to be made, while also permitting the boom to be rotated to permit spraying on either side of the carrier.

Among other objects are the following: The sprayer can be used as a broadcast sprayer for large areas by removing the wishbone spraying system from the tip of the boom and installing a spray bar system containing a support bar, drop lines and spray nozzles. When used in this fashion the boom can be contoured to approximate the contour of the terrain being sprayed. The entire boom can be raised or lowered hydraulically to achieve optimum spraying height for the spray nozzles; the entire boom can also be tilted vertically above or below level, and the mid-boom section can be extended or retracted to give the desired width. Further, the tip boom section can be rotated vertically to match the area to be sprayed, e.g., from vertical for fences or brush spraying to below level for fill slopes or ditch banks. In the broadcast mode, spot spraying of brush or weeds is possible because individual segments of the boom sprayers can be activated by a control panel consisting of electrical switches which activate sprayer valves. It is intended that retraction of the boom will cause shutting off of spray nozzles on the support section of the boom in order to eliminate double-coverage spraying.

It is intended that the apparatus be completely self contained with its own power source to operate electrical, hydraulic and spraying systems of the apparatus, for permitting it to be carried in most trucks, on trailers or mounted on its own axle.

Among still other objects will be noted as follows: The spraying apparatus is controlled by a portable control console carried on the unit or in a truck cab, there being individual controls to permit activating any hydraulic function of the spray boom and to control operation of various combinations of sprayer nozzles. The unit is intended to provide precise spraying of weeds or brush in guardrail or fences, broadcast spraying of large areas, spot spraying of undesirable weeds or brush, treatment of insects in trees or shrubs and control of brush under overhead utility lines. Further, the new sprayer apparatus is suitable for use in highway right of way maintenance, utility line maintenance, in farming operations or in diverse land management operations, being a multiple purpose apparatus capable of applying herbicides and insecticides in a more efficient and more controlled manner than other, by use of apparatus or methods currently in use.

Briefly, the new spraying apparatus comprises a supporting frame holding boom supports, a power unit, a hydraulic system for providing hydraulic pressure to double-acting hydraulic cylinders which position components of the apparatus, a spray delivery system including pump, hose, valves and nozzles, and an electrical control panel. The boom is a three member unit which can be lifted vertically by means of double acting hydraulic cylinders in a telescoping upright post attached to a main frame of the apparatus. The entire boom can be tilted vertically, such as from approximately 30 degrees below to approximately 45 degrees above level. The entire boom can be rotated horizontally 360 degrees for thereby permitting spraying on either side of the unit. A mid-boom section telescopes inside a supporting section of the boom by means of a hydraulic motor drive arrangement. A tip boom section can be rotated vertically by articulating movement relative to the mid-boom section by hydraulically drive means through approximately 270 degrees for terrain conformance when spraying, and so that the tip boom section is foldable into storage position over the mid-boom section which retracts into the support boom section for transport. The tip boom section can be reconfigured to provide a "wishbone" drop for strip spraying which includes angular adjustment means for providing selective angular adjustment of the wishbone drop relative to the longitudinal axis of the mid-boom section for orientation permitting spraying along the length of a strip of vegetation as the apparatus is moved parallel to it.

Other features will be in part apparent and in part pointed out in the following description.

BRIEF DESCRIPTION OF THE DRAWINGS

Corresponding reference characters indicate corresponding elements throughout the several views of the drawings.

DESCRIPTION OF THE PREFERRED EMBODIMENT

Figure 1:
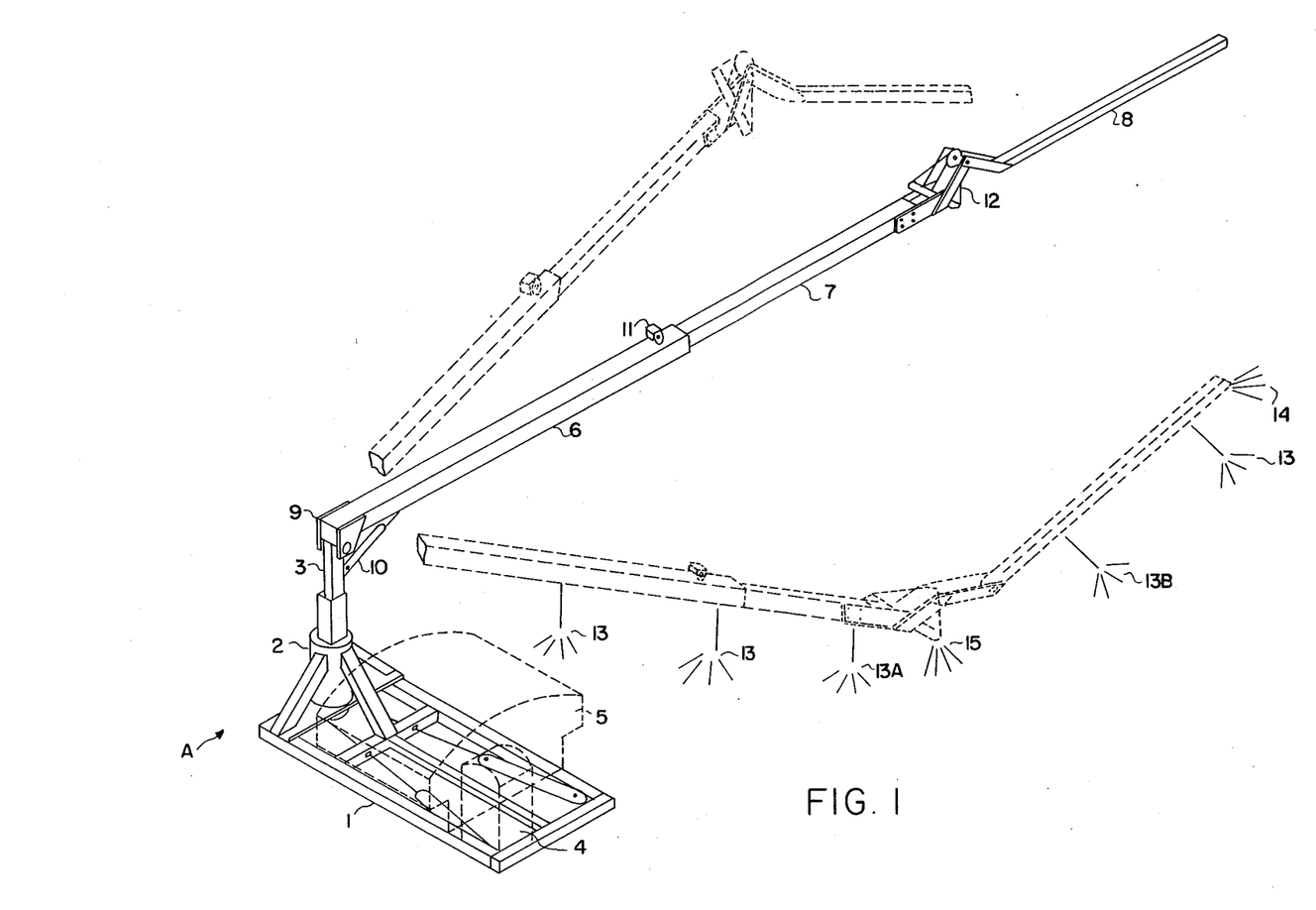
FIG. 1 is a perspective view of spraying apparatus constructed in accordance with and embodying the present invention.
Figures 8, 9:
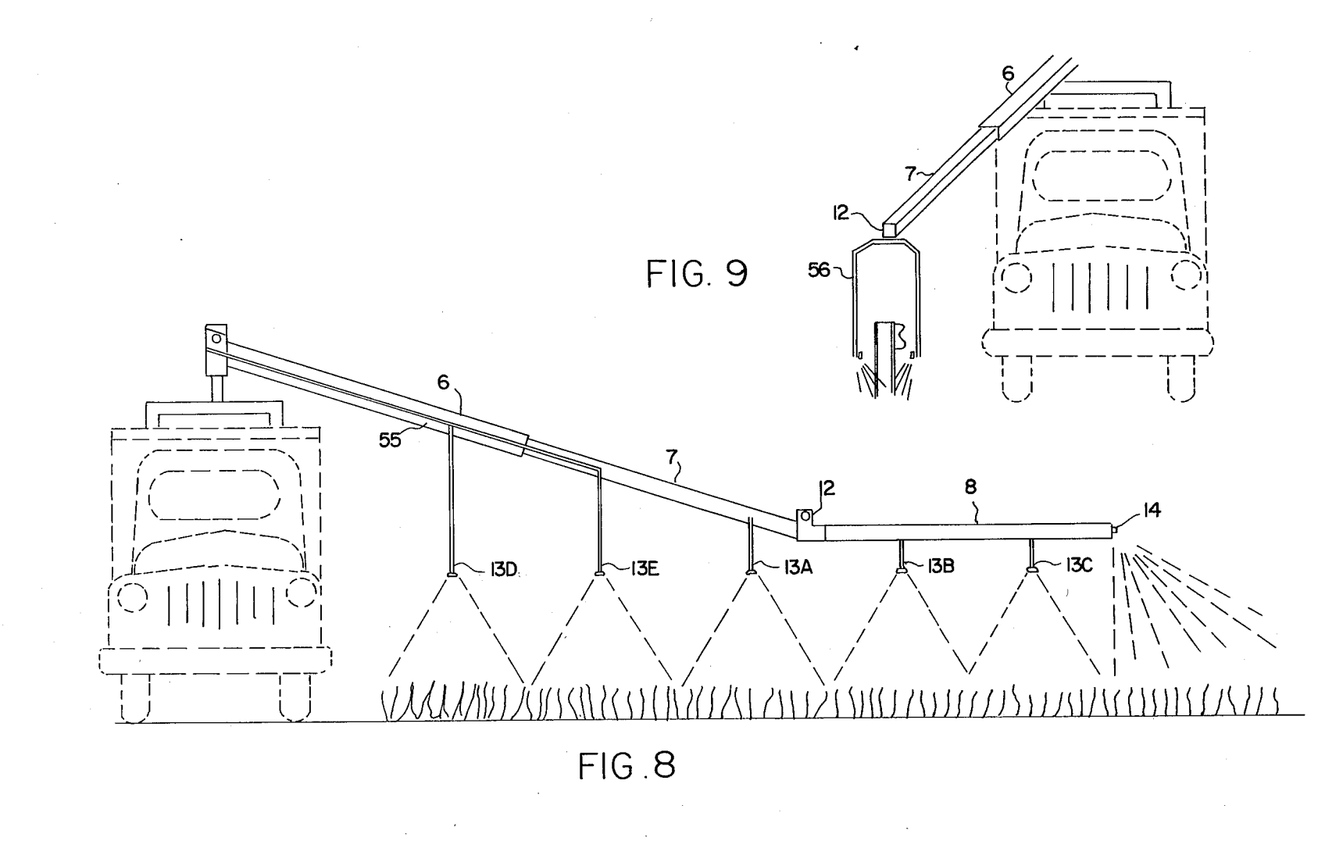
FIG. 8 is an elevation view of the apparatus as configured for broadcast spray mode.
FIG. 9 is a similar elevation view of the apparatus as employed in strip spray mode.

Looking at FIG. 1, spraying apparatus A of the invention is illustrated for transport inside a truck bed (as shown in FIGS. 8 and 9) or upon a trailer (not shown). The sprayer comprises a main frame 1 to provide support for an upright post socket 2 in which an upright post 3 can be selectively rotated 360 degrees and can be selectively telescoped vertically. A power unit 4 is symbolically shown and includes a conventional hydraulic pump, and hydraulic reservoir, as well as suitable solenoid-operated hydraulic valves, sprayer pump and solenoid-operated sprayer valves. A sprayer tank 5 is shown in phantom.

A boom comprised of a supporting boom section 6, a mid-boom section 7 and a tip boom section 8 is supported pivotally by upright post 3 by a hydraulically positioning mechanism so that the entire boom can be selectively tilted vertically through an included angle of approximately 75 degrees, preferably between approximately 45 degrees above level and approximately 30 degrees below level. Such rotation is about a suitable pivot pin (not shown) in bracket assembly 9. Such pivoting movement is selectively controlled by a double-acting hydraulic cylinder 10. Mid-boom section 7 telescopes within supporting boom section 6. Power for telescoping movement of mid-boom section 7 is provided by a reversible hydraulic motor 11. Tip boom section 8, which is a first possible type of reconfigurable boom element or accessory for providing conformal movement relative to vegetation or ground to be sprayed, can be rotated 270 degrees in a vertical plane by means of an hydraulic actuator assembly 12. The phantom boom illustration depicts the tilting of support boom section 6, telescoping of mid-boom section 7 and rotation of tip section 8.

Broadcast spray nozzles 13 carried by the boom are shown in the various positions along the boom length, there being also a tip spray nozzle 14. As the boom section 8 is rotated upward a gap is created between broadcast nozzles 13a and 13b adjoining actuator assembly 12. Joint spray nozzle 15 is automatically turned on and off as needed to cover the gap created as the actuator assembly 12 is operated. Broadcast spray nozzles 13 and top spray nozzle 14 can be remotely controlled momentarily, singly or in any combination.

Figure 2:
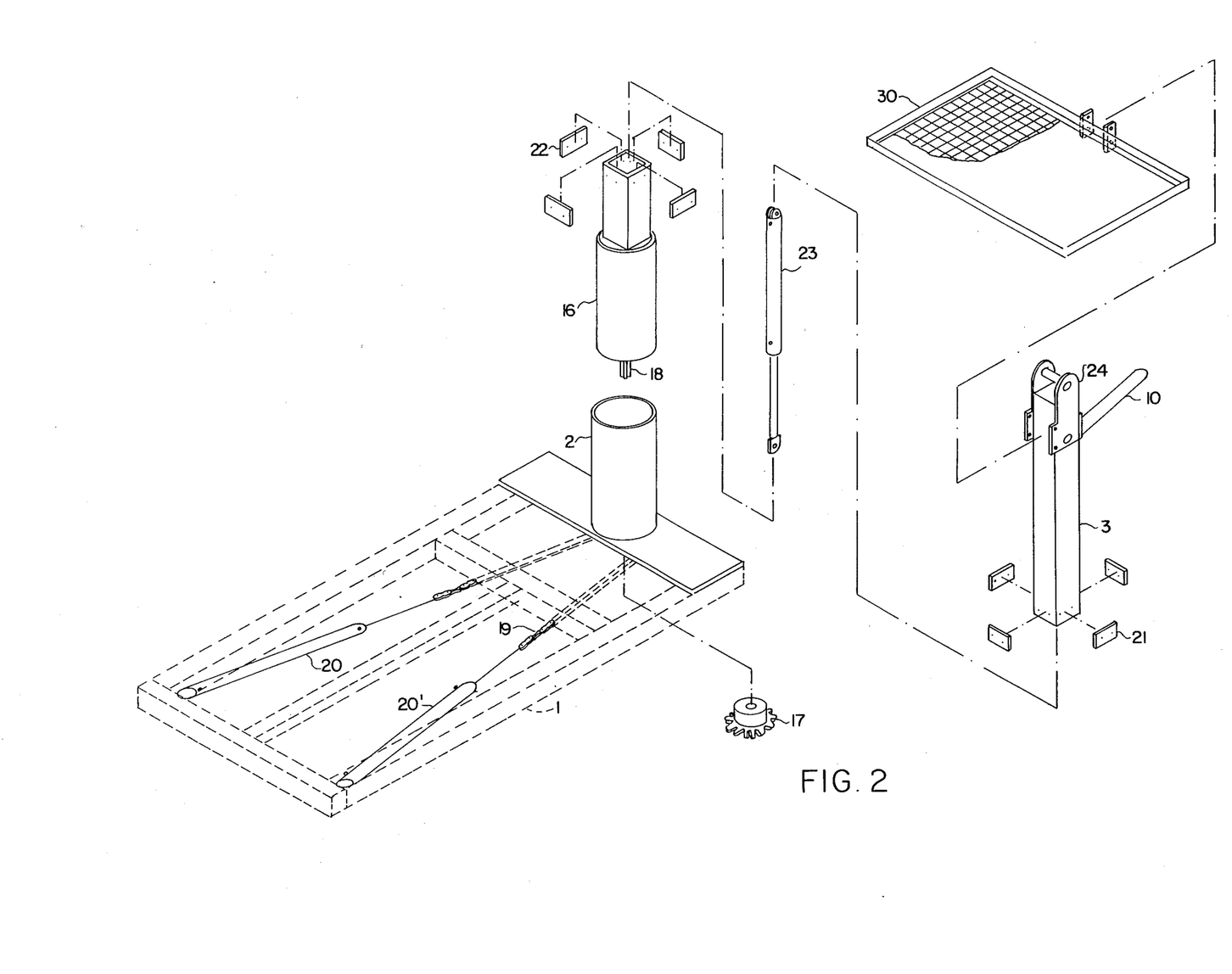
FIG. 2 is a perspective view of an upright post assembly.

The upright post assembly is shown in FIG. 2. The main frame 1 supports upright post socket 2. An upright post core 16 has a cylindrical outer shape to match the inner section of upright post socket 2. This permits upright post core 16 to rotate while being supported vertically and protects against overturning. The inner shape of upright post socket 16 is square to match upright post 3. Rotation of upright post core 16 is accomplished by a sprocket 17 being attached to splined shaft 18 being part of upright post core 16. A roller chain 19 rotates sprocket 17 by being attached at each end to retracting single action hydraulic cylinders 20, 20'. As one of hydraulic cylinders 20, 20' is retracted the other is allowed to extend thus pulling roller chain 19 which in turn rotates sprocket 17 and upright post core 16. Upright post 3 is fitted into upright post core 16 with bearing pads 21 attached to the lower end of upright post 3 on the outer surface and bearing pads 22 attached to the inner surface of upright post core 16 at the top. The square cross section provides for the transmission of rotational torque from upright post core 16 to upright post 3. Bearing pads 21 and 22 allow upright post 3 to telescope vertically within upright post core 16. A double acting hydraulic cylinder 23 is located inside upright post 3 with the cylinder top end pinned (not shown) to upright post 3 and the cylinder bottom end pinned (not shown) to the inside of upright post core 16 for providing motive power to telescope upright post 3 vertically. Plates 24 are attached to upright post 3 to provide the pin connection for attaching the boom through bracket assembly 9, as illustrated in FIG. 1.

Figure 3:
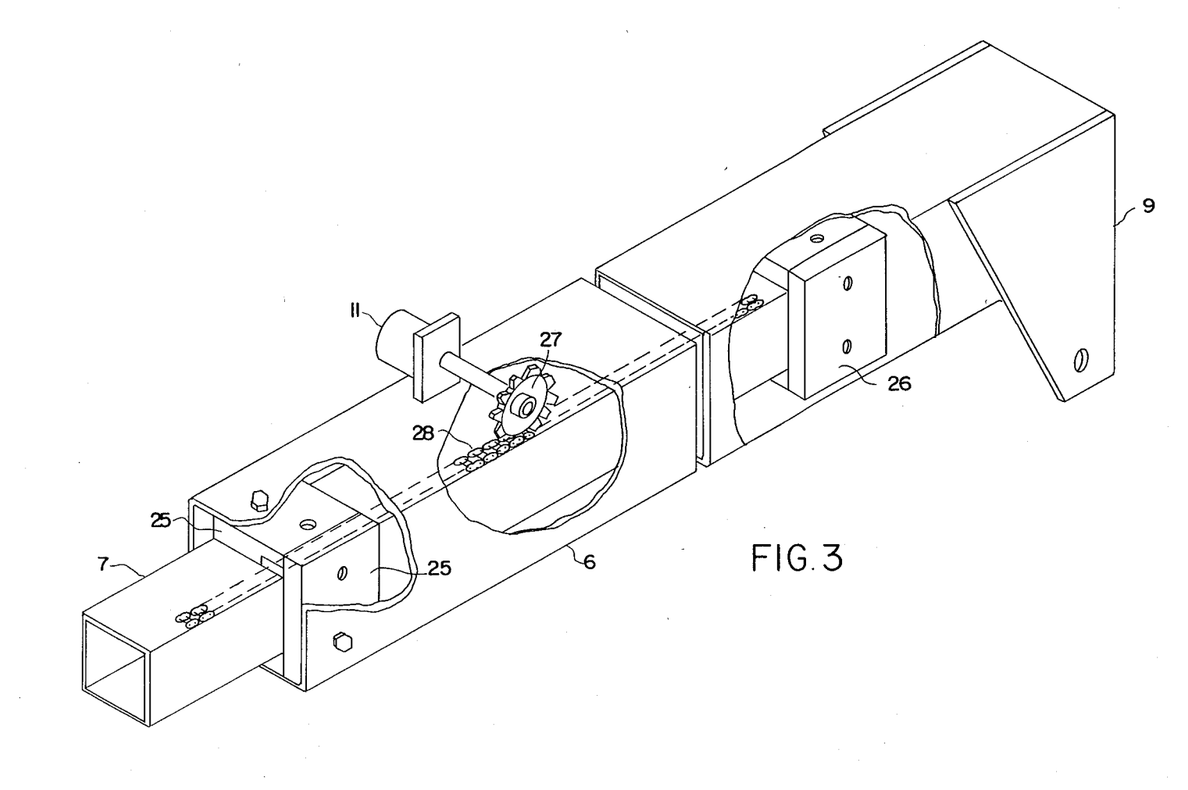
FIG. 3 is a perspective view of boom portions, showing in particular telescoping functions of a mid-boom section within a supporting boom section.

FIG. 3 illustrates the telescoping functions of mid-boom section 7 within supporting boom section 6. Bearing pads 25 are attached inside of support boom section 6 and bearing pads 26 are attached outside mid-boom section 7 to provide wear surfaces for telescoping mid-boom section 7. Reversible hydraulic motor 11 attached to support boom section 6 drives a sprocket 27 which meshes with roller chain 28. A roller chain 28 is attached to mid boom section 7 for extending and retracting it as motor 11 rotates sprocket 27.

Figure 4:
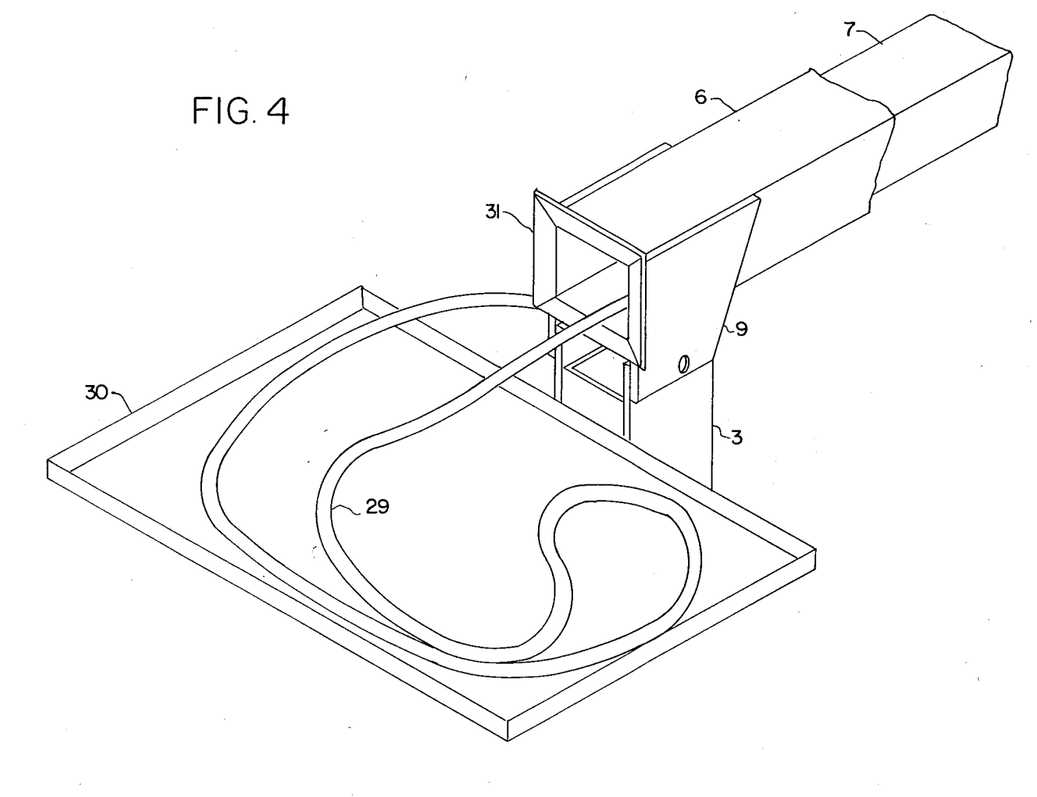
FIG. 4 is a perspective view of the certain hose elements serving the boom.

FIG. 4 illustrates a hydraulic and spray hose group or bundle 29 passing through the boom assembly. As mid-boom section 7 extends and retracts, hydraulic and spray hose group 29 serving the boom section must change length with respect to upright post 3. This length change is facilitated by a loop in the hose group as illustrated. A hose rack 30 of pan-like character supports the loop in hose group 29 and the rack rotates with supporting boom section 6, allowing the hose group to freely slide into the boom center. A flanged guide 31 fixed to the end of supporting boom section 6 protects hose group 29 from sharp edges, thus facilitating its free sliding in the boom. FIG. 2 illustrates hose rack 30 supported by plates 24 on upright post 3.

Figure 5A:
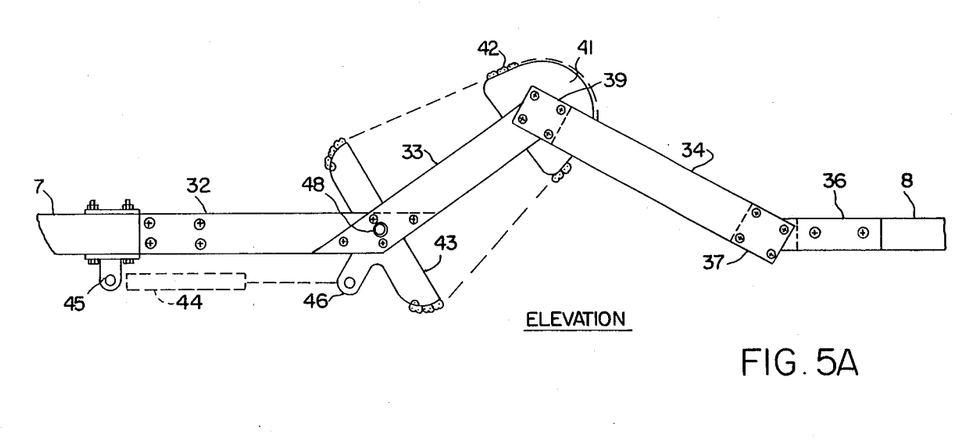
FIGS. 5A and 5B are, respectively, fragmentary elevation and plan views of a vertical actuator assembly for the boom.
Figure 5B:
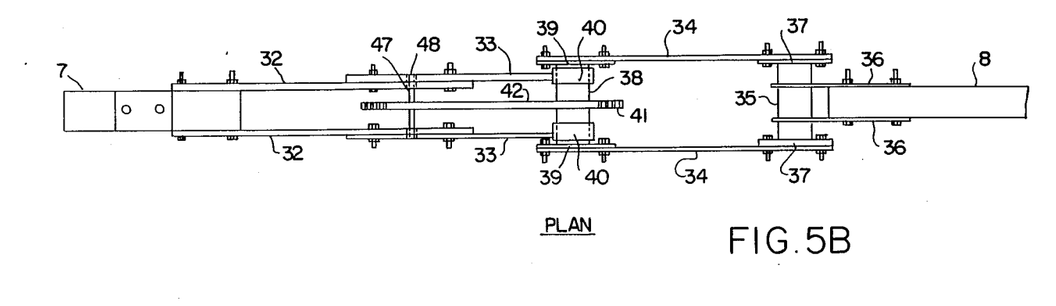

FIGS. 5A and 5B illustrate the vertical actuator assembly for tip boom section 8. Support straps 32 fixed to the end of mid boom section 7 support tip boom section 8 and its actuator assembly. Fixed links 33 are supported by support straps 32 with rotating links 34 being supported by the outermost end of fixed links 33. Tip boom section 8 is cantilevered from a boom hanger 35, a tube with cantilever straps 36 fixed to it for supporting tip boom section 8. Flanges 37 are fixed to each end of boom hanger 35 rigidly attaching boom hanger 35 to rotating links 34. An actuating tube 38 supports and rotates links 34 through flange 39 which is fixed to each end of the tube. Actuating tube 38 is supported and rotates within a bearing 40 carried at the outermost end of fixed links 33.

A geometrically eccentric sprocket 41 is fixed to actuating tube 38 and provides the torque force for vertically rotating tip boom section 8, i.e., for providing selective articulating movement thereof, being driven by a roller chain 42 attached to the radically opposed radiused outer ends of a rocker arm 43 which provide an effective radius arm much greater than the effective radius of sprocket 41 thereby giving stepped-up, variable ratio positioning of link 34 for positioning of tip boom 8 to provide continuous terrain contour-following ability for the boom, i.e., contour approximation during spraying. Rotational force for selective positioning of actuator arm 43 is provided by a double-acting hydraulic cylinder 44 pin connected between a fixed lug 45 and an actuating arm lug 46. Actuator arm 43 is supported on shaft 47 which rotates in bearings 48, which are fixed in straps 32 and fixed links 33 at their intersection. Geometrical sprocket 41 with its eccentric peripheral shape compensates for the normally changing length of roller chain 42 as actuator arm 43 rotates, thus keeping roller chain 42 taut throughout the rotating cycle.

Figures 6, 7:
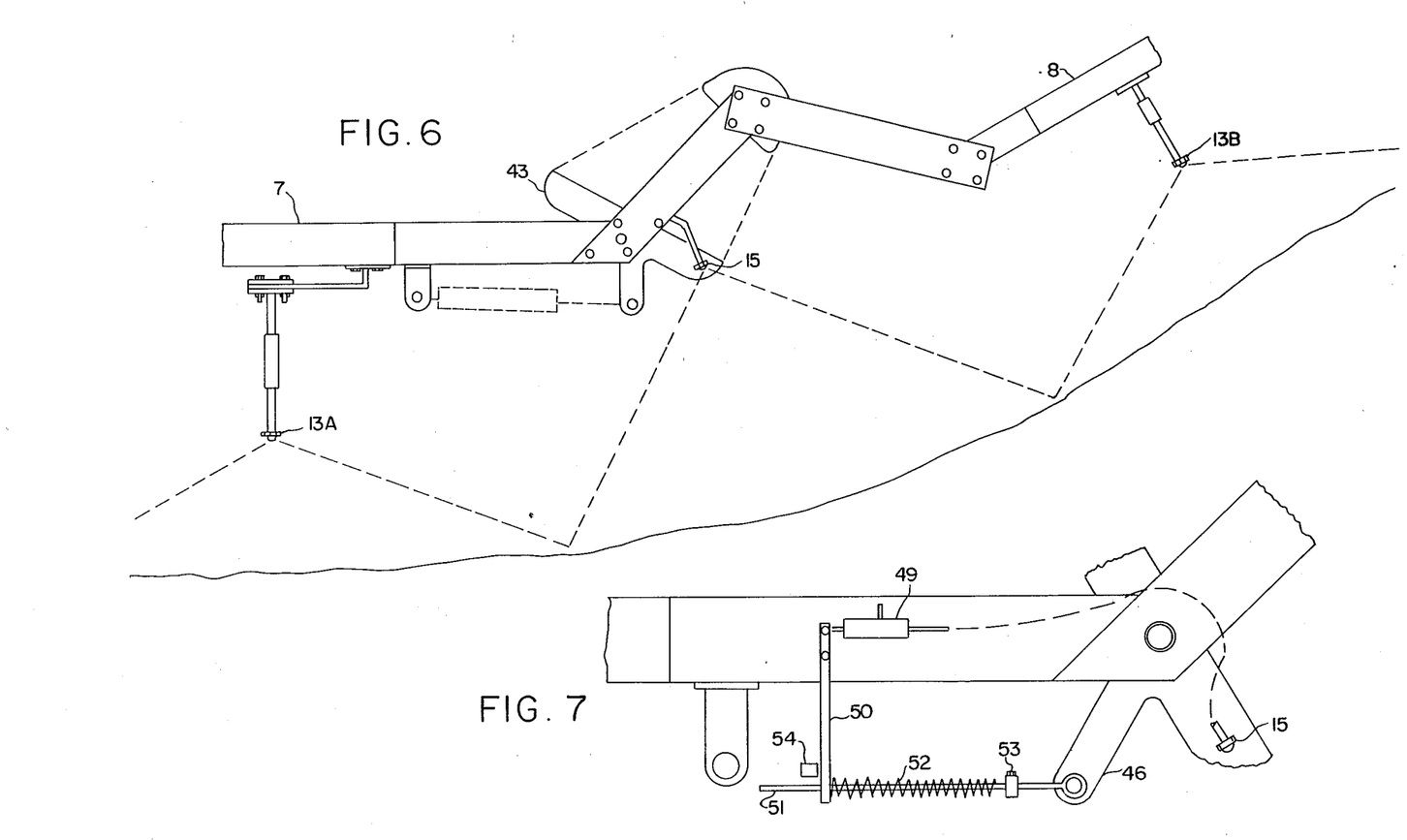
FIG. 6 is a fragmentary side elevation view of boom portions and spray nozzles, including a joint spray nozzle.
FIG. 7 is a fragmentary side elevation view of a joint of the boom and associated joint spray nozzle control valve.

FIG. 6 illustrates the boom in broadcast spraying mode with the orientation of the boom and its tip boom section 8 adjusted to match ground contour. When mid-boom section 7 and tip boom section 8 approximate a straight line the spray pattern of nozzles 13a and 13b will meet. As tip boom section 8 is rotated upward, a gap is created between the spray patterns of nozzles 13a and 13b. Spray nozzle 15 is activated by our automatic control valve (FIG. 7) to spray the gap described. Nozzle 15, being attached to actuator arm 43, will approximately keep itself centered on the spray gap since actuator arm 43 rotates proportionally with the rotation of tip boom section 8.

FIG. 7 illustrates the automatic control 49 valve for joint spray nozzle 15. Valve 49 is hose-connected to nozzle 15 to pressurize the nozzle as required. Valve arm 50 opens control valve 49 for flow ehn no force is applied to the arm. Valve rod 51 is pin-connected to actuator arm lug 46 and passes slidably through an aperture in a pivoted valve arm 50. When tip boom section 8 (FIG. 6) is rotated upwardly, actuator arm lug 46 rotates counterclockwise thus moving a spring 52 and an adjustably positioned collar 53 away from valve arm 50, allowing control valve 49 to pressurize nozzle 15 and spray the gap created between nozzles 13a and 13b in FIG. 6. As tip boom section 8 (FIG. 6) is rotated downwardly causing the spray pattern of nozzles 13a and 13b to meet, control valve 49 is closed, turning off nozzle 15 by the clockwise motion of actuator arm lug 46 which compresses spring 52 between collar 53 and valve arm 50. Continued rotation of actuator arm lug 46 will further compress spring 52. The valve seat in control valve 49 is protected from excessive or damaging force by stop 54 which limits the travel of valve arm 50.

FIG. 8 illustrates the preferred embodiment in broadcast spray mode. This mode utilizes supporting boom section 6, mid-boom section 7, actuator assembly 12, tip boom section 8 and auxiliary boom 55. Nozzle 13a is supported from mid-boom section 7, nozzles 13b, 13c and 14 are supported from tip boom section 8, and auxiliary boom 55 supports nozzles 13d and 13e. As mid-boom section 7 is retracted to change spray width, spray nozzle 13a would overlap nozzle spray 13e, but one of a series of boom-operated microswitches 62 (FIG. 11) closes nozzle 13e. When nozzle 13a is retracted by boom movement toward nozzle 13d, another one of microswitches (FIG. 11) will close nozzle 13d, again to prevent substantial spray overlap as the boom length shortens during retraction of section 7. The microswitches 62 are connected with conventional solenoid valve control circuits to control fluid flow.

FIG. 9 illustrates configuration of the preferred embodiment for providing strip spray mode. This mode utilizes supporting boom section 6, mid-boom section 7, actuator assembly 12 and a so-called wishbone drop 56 for spraying along both sides and under a guardrail or fence in one pass. Wishbone drop 56 is used in place of tip boom section 8 but similarly provides conformal movement relative to vegetation, etc. to be sprayed. Drop 56 is provided with inverted U-shaped configuration and elements more fully explained below relative to FIG. 12.

Figures 10A, 10B, 11A, 11B:
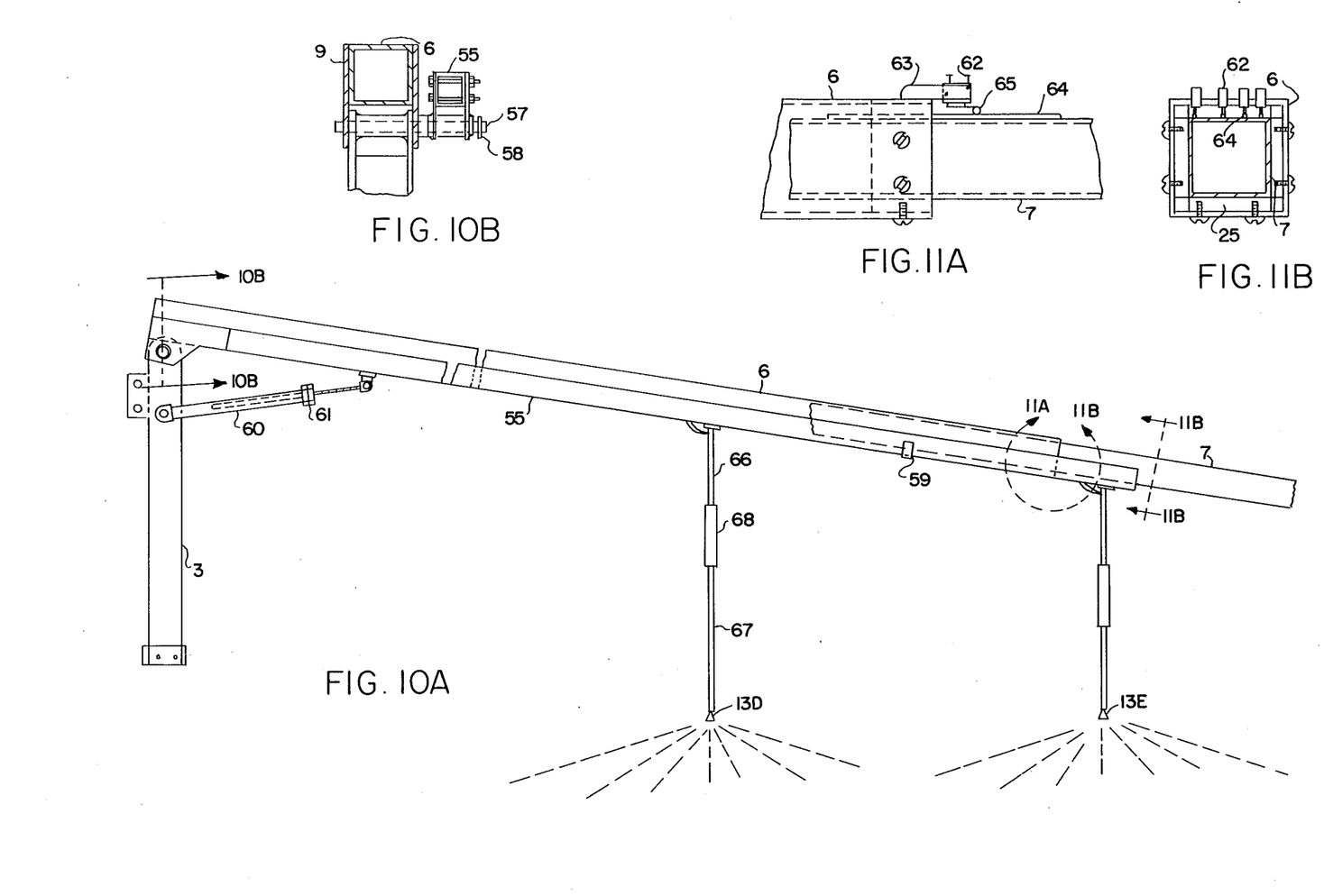
FIGS. 10A and 10B are, respectively, a fragmentary side elevation view and a transverse section of an auxiliary boom of the present apparatus.
FIGS. 11A and 11B are, respectively, a fragmentary detail elevation and an end view of boom positions having electrical microswitches, as taken generally along the lines designated 11A—11A and 11B—11B of FIG. 10A.

FIG. 10A illustrates a further embodiment. An auxiliary spray boom 55, pin-connected as shown in FIG. 10B, is provided for being carried by the supporting boom section 6 and mid-boom section 7 when extended. Auxiliary boom 55 is pivotally affixed by an extended pin 57 which connects supporting boom section 6 to upright post 3, this pin being retained by a hairpin 58. Auxiliary boom 55 elevates about pin 57 with the outer end supported by an arm 59 which is rigidly attached to support boom section 6. As supporting boom section 6 is rotated in a vertical plane it carries with it auxiliary boom 55 which thereby follows the profile of supporting boom section 6, which rests in arm 59. A telescoping link 60 is pinned between upright post 3 and auxiliary boom 55 to limit the vertical downward rotation of auxiliary boom 55 through an adjustable stop 61. Specifically, if supporting boom section 6 is depressed substantially from level, stop 61 will prevent further depression of auxiliary boom 55. This limiting preserves the critical spray distance between nozzles 13D, 13E relative to ground to prevent gaps in the spray pattern and also prevents nozzles 13d and 13e from contacting or digging into ground as supporting boom section 6 is lowered over a downward slope.

Nozzle 13d is used to illustrate a typical nozzle support. Nozzle drops 66 and 67 suspend nozzle 13d from boom section 55 with drops 66 and 67 being connected by a flexible coupler 68. All connections being liquid tight, the spray chemicals flow through drop 66, coupler 68 and drop 67 to nozzle 13d.

FIG. 11 illustrates the microswitches for control of the flow to spray nozzles and for limiting travel of the mid-boom section. Each microswitch 62 is suspended above mid-boom section 6 by bracket 63. Microswitches 62 are activated by a square activator strips 64 carried atop mid-boom section 7. As the activator strip 64 passes under its associated microswitch 62, it depresses the microswitch arm 65 to activate the switch. Microswitches 62 are used to control the extension and retraction limits of mid-boom section 7 by controlling hydraulic motor 11 (FIG. 3) and also by controlling the shutoff of nozzles 13d and 13e (FIG. 8). Each microswitch 62 has an individual actuator strip 64 appropriately placed along the length mid-boom section 7. The top bearing pad 25 (FIG. 3) is notched appropriately to permit the actuator strips 64 to pass through.

Figure 12A:
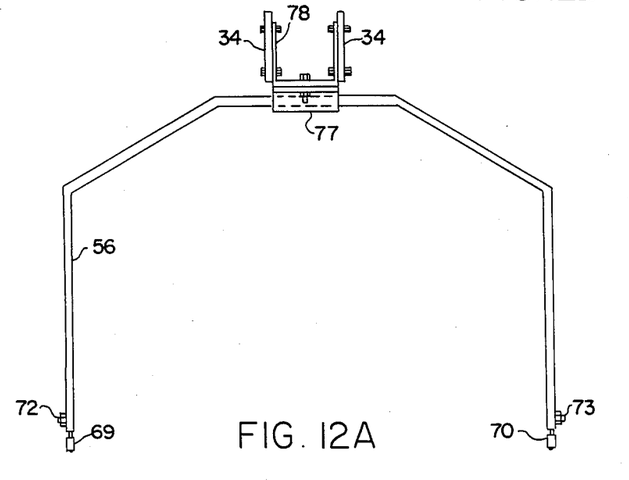
FIGS. 12A, 12B and 12C are, respectively, detail front, side and top views of a certain strip sprayer wishbone drop used with the boom.
Figure 12B:
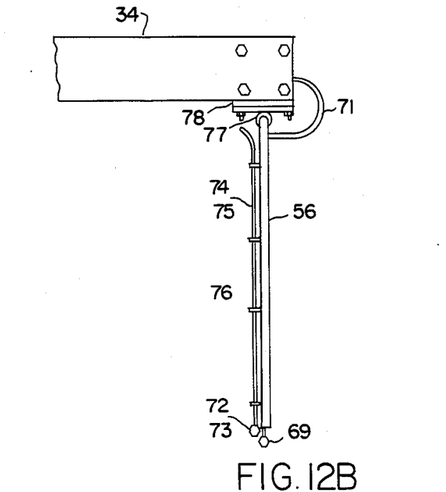
Figure 12C:
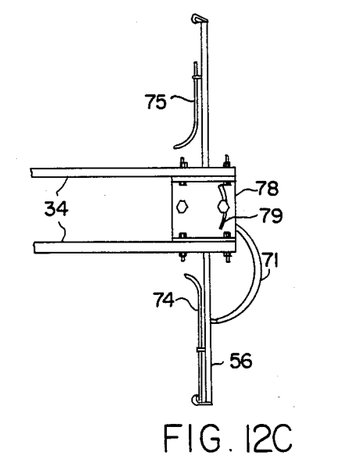

FIGS. 12A–12C detail wishbone drop 56 illustrated in FIG. 9. In the front view, FIG. 12A, wishbone drop 56 is shown to be of tubular configuration supporting on opposite sides nozzles 69 and 70 at the lower end for strip spray along either side and under a rail or fence line. Wishbone drop 56 is thus a "wet" drop with the spray chemicals entering through hose 71 and flowing through the tubular drop to nozzles 69 and 70. Additional nozzles 72 and 73 are attached to the sides of the lower end of drop 56, being directed outwardly for providing widening of the spray strip pattern or for spraying along the side of an object over which wishbone drop 56 will not reach. Nozzles 72 and 73 are independently controlled with a hose 74 (FIG. 12C) feeding nozzle 72 and a hose 75 feeding nozzle 73. In FIG. 12B, eyelets 76 are shown attached to drop 56 to provide means for attaching and dressing hoses 74 and 75 to drop 56 on the respective sides. As will be seen in FIGS. 12A and 12B, drop 56 is suspended pivotally, being free to rotate in a hanger 77 about a horizontal, generally transverse axis. Gravity thus maintains drop 56 in a vertical position. Hanger 77 is bolted to a bracket 78 for thereby supporting wishbone drop 56. Slot 79 (FIG. 12C) provides selective angular adjustment for setting the pivot axis at a desired angle to the longitudinal axis of mid-boom members 34, thereby to permit setting of the plane of the wishbone drop 56 normal to the strip being sprayed. Bracket 78 is bolted to rotating link 34 (FIG. 5) when boom hanger 35 and tip boom section 8 (see also FIG. 5) have been removed.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

We claim:

1. Apparatus for spraying of liquid for herbicidal and insecticidal application and the like, comprising a supporting frame for being carried vehicularly, an upright support carried by the frame including an upright post and first telescoping means for providing selective vertical telescoping movement of the post and rotation thereof relative to the upright support, a boom carried by the post, means for providing selective pivoting of the boom relative to the post for vertical boom movement, the boom including a supporting boom section, a mid-boom section and a reconfigurable boom end element, the boom including second telescoping means for providing selective telescoping movement of the mid-boom section relative to the supporting boom sections, the supporting boom section, mid-boom section and boom end element all including spray nozzle means for selective spraying of liquids, the boom sections and end element providing selective positioning as well as approximation of terrain contour to be sprayed.

2. Spraying apparatus according to claim 1 wherein the boom end element comprises an elongated tip boom section and pivot means pivotally affixing the tip boom section to an outer end of the mid-boom section, the mid-boom section including hydraulic positioning means for selectively rotating the tip boom section relative to the mid-boom section by articulating movement.

3. Spraying apparatus according to claim 2 wherein the hydraulic positioning means provides for selectively rotating the tip boom section vertically relative to the mid-boom section through an angle of approximately 270° for terrain conformance and to storage position over the mid-boom section.

4. Spraying apparatus according to claim 1 wherein the boom end element comprises a wishbone drop including spray nozzle means extending downwardly from opposite sides of said drop to provide strip spray on opposite of vegetation, and pivot means pivotally affixing the wishbone drop to an outer end of the mid-boom section for positioning relative to vegetation to be strip sprayed.

5. Spraying apparatus according to claim 4 wherein the pivot means is configured for permitting the wishbone drop to rotate relative to the outer end of the mid-boom section about a horizontal pivot axis whereby gravity maintains the wishbone drop in vertical position.

6. Spraying apparatus according to claim 5 wherein the mid-boom section further comprises angular adjustment means for providing selective angular adjustment of the horizontal pivot axis at a desired angle to a longitudinal axis of the mid-boom section whereby to permit setting of the plane of the wishbone drop normal to a vegetation strip to be sprayed.

7. Sprayed apparatus according to claim 1 further comprising switch means responsive to telescoping movement the mid-boom section relative to the supporting boom section for selectively controlling spray by the spray nozzle means along the boom to prevent substantial spray overlap by the spray nozzle means along the boom as the boom length changes.

8. Spraying apparatus according to claim 1 wherein the boom end element is an articulatable tip boom section including means for providing selective articulating movement thereof, and further comprising switch means responsive to such articulating movement for selectively controlling spray by the spray nozzle means along the boom to prevent substantial spray overlap by the spray nozzle means as the tip boom section articulates relative to the mid-boom section.

9. Spraying apparatus according to claim 1 further comprising an auxiliary spray boom pivotally affixed to an inner end of the supporting boom section, the auxiliary boom having an outer end supported by the supporting boom section for thereby being carried by the supporting boom section, the auxiliary boom carrying spray nozzles, and further comprising adjustable stop means for limiting downward rotation of the auxiliary boom upon substantial depression of the supporting boom section whereby to preserve a critical spray distance between the auxiliary boom spray nozzles and ground.

10. Apparatus for spraying of liquids for herbicidal and insecticidal application and the like, comprising a supporting frame for being carried vehicularly, an upright support carried by the frame including an upright post, first hydraulic means for providing selective vertical telescoping movement of the post, a boom carried by the post including spray nozzles spaced along the length of the boom, second hydraulic means for providing selective rotation of the boom in a horizontal plane relative to the frame, third hydraulic means for providing selective pivoting of the boom relative to the post for vertical boom movement, whereby the boom can be selectively positioned in both horizontal and vertical planes, the boom including a supporting boom section having an inner end pivotally attached to the post, a mid-boom section extending from the supporting beam section, and a tip boom section extending from the mid-boom section, the boom including a fourth hydraulic means for providing selective telescoping movement of the mid-boom section relative to the supporting boom section, and contour-following means including fifth hydraulic means for selective articulating movement and for positioning of the tip boom section relative to terrain contour to be sprayed.

11. Spraying apparatus according to claim 10 wherein the contour following means comprises pivot means providing articulation between the tip boom section and the mid-boom section and means for selectively rotating the tip boom section relative to the mid-boom section comprising an eccentric sprocket carried by the tip boom section, selectively positionable actuator arm means carried by the mid-boom section, chain means interengaging the actuator arm means for rotation of the eccentric sprocket in response to selective positioning of the actuator arm means, and said fifth hydraulic means comprises a hydraulic cylinder for bringing about selective positioning of the actuator arm means, whereby the tip boom is positionable for boom terrain contour following.

12. Apparatus for spraying of liquids for herbicidal and insecticidal application and the like, comprising a supporting frame for being carried vehicularly, an upright support carried by the frame including an upright post and first hydraulic cylinder means for providing selective vertical telescoping movement of the post, a boom carried by the post, second hydraulic cylinder means for providing selective rotation of the boom in a horizontal plane relative to the frame, third hydraulic cylinder means for providing selective pivoting of the boom relative to the post for vertical boom movement, whereby the boom can be selectively positioned horizontally as well as vertically, the boom including a supporting boom section having an inner end pivotally attached to the post, a mid-boom section extending from the supporting beam section, and a tip boom section extending from the mid-boom section, the boom including hydraulic motor means for providing selective telescoping movement of the mid-boom section relative to the supporting boom section, the tip boom section being pivotally attached to the mid-boom section for articulating movement, hydraulic cylinder means for controlling such articulating movement to provide selective positioning as well as approximation of terrain contour to be sprayed, the supporting boom section, mid-boom section selective spraying of liquids.

13. Apparatus for spraying of liquids for herbicidal and insecticidal application and the like, comprising a supporting frame for being carried vehicularly, an upright support carried by the frame including an upright post and first hydraulic cylinder means for providing selective vertical telescoping movement of the post, a boom carried by the post, second hydraulic cylinder means for providing selective rotation of the boom in a horizontal plane relative to the frame, third hydraulic cylinder means for providing selective pivoting of the boom relative to the post for vertical boom movement, whereby the boom can be selectively positioned horizontally as well as vertically, the boom including a supporting boom section having an inner end pivotally attached to the post, a mid-boom section extending from the supporting beam section, and a strip spray fixture extending from the mid-boom section and pivotally attached thereto, the boom including hydraulic motor means for providing selective telescoping movement of the mid-boom section relative to the supporting boom section, the strip spray fixture including oppositely disposed spray nozzle means for selective spraying of liquids on opposite sides of a strip of vegetation or the like, and angular adjustment means for providing selective angular adjustment of strip spray fixture relative to a longitudinal axis of the mid-boom section for orientation of the strip spray fixture relative to the strip for spraying along its length by movement of the apparatus parallel to the strip.

* * * * *

UNITED STATES PATENT AND TRADEMARK OFFICE
CERTIFICATE OF CORRECTION

PATENT NO. : 4,784,324
DATED : November 15, 1988
INVENTOR(S) : Carl DeWitt et al It is certified that error appears in the above-identified patent and that said Letters Patent is hereby corrected as shown below:

Column 8, Claim 4, Line 52, after the word "opposite" insert
---sides---.

Column 9, Claim 7, Line 1, "Sprayed" should be ---Spraying---.

Column 10, Claim 12, Line 32, after the word "section" insert
---and boom end element all including spray nozzle means for---
(2nd occurrence)

Signed and Sealed this

Twenty-first Day of March, 1989

*Attest:*

DONALD J. QUIGG

*Attesting Officer*  *Commissioner of Patents and Trademarks*